United States Patent [19]

Shenk

[11] Patent Number: 5,774,626

[45] Date of Patent: Jun. 30, 1998

[54] PROGRAMMABLE DUAL-PHASE DIGITAL MOTOR CONTROL WITH SLIDING PROPORTIONALITY

[75] Inventor: Edwin K. Shenk, Westford, Mass.

[73] Assignee: Polaroid Corporation, Cambridge, Mass.

[21] Appl. No.: 558,737

[22] Filed: Nov. 16, 1995

[51] Int. Cl.⁶ .................................................... G05F 1/10
[52] U.S. Cl. .......................... 388/815; 388/811; 388/813
[58] Field of Search ..................................... 388/803–815, 388/816–822

[56] References Cited

U.S. PATENT DOCUMENTS

| | | | |
|---|---|---|---|
| 3,582,541 | 6/1971 | Hebb | 178/6.6 |
| 3,753,067 | 8/1973 | Milligan | 388/815 |
| 3,906,319 | 9/1975 | Milligan | 388/815 |
| 4,193,020 | 3/1980 | Song | 388/815 |
| 4,211,967 | 7/1980 | Akiyama et al. | 318/490 |
| 4,218,735 | 8/1980 | McCutcheon | 364/118 |
| 4,280,082 | 7/1981 | Acharya et al. | 388/815 |
| 4,287,461 | 9/1981 | Promis et al. | 318/571 |
| 4,307,324 | 12/1981 | Regnier | 388/815 |
| 4,365,888 | 12/1982 | Hosaka et al. | 355/14 R |
| 4,371,254 | 2/1983 | Beery | 355/8 |
| 4,380,723 | 4/1983 | Leis et al. | 388/815 |
| 4,564,795 | 1/1986 | Parkes et al. | 318/802 |

*Primary Examiner*—David S. Martin
*Attorney, Agent, or Firm*—Christopher P. Ricci; Joseph Stecewycz

[57] ABSTRACT

A digital motor control is described which is programmable and has dual digital phase with sliding proportionality such that the motor control adaptively alters a speed of a motor by both changing sign and altering motor speed proportionally to an amount of motor speed error.

13 Claims, 8 Drawing Sheets

PROGRAMMABLE DUAL-PHASE DIGITAL MOTOR CONTROL WITH SLIDING PROPORTIONALITY

BACKGROUND OF THE INVENTION

The present invention relates generally to motor controls, and, more particularly, the invention relates to motor controls for printers for adaptively controlling a speed of a motor in the printer to avoid print artifacts.

Electronic printers have long been used with computers to print images from the computers. To do so, the computer transmits an image as image data representative of the image to the printer through a common interface, and the image data, usually in digital form, is interpreted by the printer such that the image is printed on a hard-copy medium. Within the printer, the hard-copy medium is either passed through the printer where it is exposed to a print head which presents the image onto the hard-copy medium or the hard-copy medium is held fixedly within the printer and the print head is driven by the motor. In either case, as the motor controls the relative motion, any digression of the motor from a constant motor speed will cause an artifact to appear on the hard-copy medium which is readily visible to a user.

To monitor the motor speed, most commercially available printers use a speed sensing device such as a tachometer. A tachometer rotates with the motor sending back a tachometer signal 14 indication a completion of a predetermined portion of a revolution. The frequency of the tachometer signal 14 is then compared to a frequency of a reference signal to determined whether the motor is going too fast or too slow. A correction is then applied to the motor control through a motor control circuit by sending a "go faster" pulse or a "go slower" pulse as the case may be. If the speed is excessively fast or slow then the pulse is again sent after another iteration and another speed difference determination is made. A problem with these motor controls is that in the comparison of frequencies the motor control response simply indicates that the motor is either faster or slower than the reference frequency and is not indicative of how fast or how slow, therefore large deviations from motor speed are corrected very slowly in that it takes numerous iterations of comparisons and small adjustments in order to get the motor speed to a required value.

Another problem with these motor control systems is that there is generally a percentage of error that is considered acceptable. In other words, the motor control will not begin to make changes to motor speed until a deviation of plus or minus five percent, for example, is exceeded. Due to the fact that these motor controls do not exactly attain the required speed even after correction, using an acceptable margin of error is a necessity. In the case of photographic imaging, for example, these deviations or print errors are unacceptable and are readily noticeable by a user.

The aforementioned motor controls have a further problem when the motor control system is used with a printer that can change aspect ratios or perform zooming functions. The problem is that in such printers the motor speed is no longer fixed, but must be programmable to an amount of the zoom or an amount of change in aspect ratio. The commercially available motor controls having a fixed speed and cannot accommodate such functions.

Accordingly, it is an object of this invention to provide a motor control that is adaptive to an amount of deviation of the motor and makes corrections proportional to that amount.

It is another object of this invention to provide a motor control that is error intolerant and pursues a fixed error of approximately zero.

It is still another object of this invention to provide a motor control which is programmable by external electronics in order to adjust motor speed.

These and other objects of the invention will be obvious and will appear hereinafter.

SUMMARY OF THE INVENTION

The aforementioned and other objects of the invention are achieved by the invention which provides a motor control for use with a printer. The motor control governs a speed of rotational motion generated by a motor within the printer to control print speed. The motor control does so by altering a drive voltage which powers the motor thus altering the speed of rotational motion of the motor. The motor control comprises a speed sensor, an oscillation means, a comparator means, and a control means.

The speed sensor monitors a speed of the motor and produces a tachometer pulse which is indicative of a completion of predetermined portion of a revolution of the motor. A frequency of consecutive tachometer pulses is then proportional to the speed of the motor.

The comparator means then compares the frequency of the consecutive tachometer pulses to a clock pulse generated by the oscillator means which is transmitted at a substantially fixed frequency. The comparator means then transmits an adjustment pulse which is indicative of the tachometer pulse being before or after the clock pulse. A duration of the adjustment pulse is proportional to a magnitude of the difference between the frequency of the speed sensor and the frequency of the oscillator means.

The switch means then adjusts the drive voltage to the motor in response to the adjustment pulse such that the speed of the motor is adjusted accordingly.

In further aspects the invention provides methods in accord with the apparatus described above. The aforementioned and other aspects of the invention are evident in the drawings and the description that follows.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION

While the present invention retains utility within a wide variety of motor controlled devices and may be embodied in several different forms, it is advantageously employed in connection with a printer. Though this is the form of the illustrated embodiment and will be described as such, this embodiment should be considered as illustrative and not restrictive.

Figure 1:
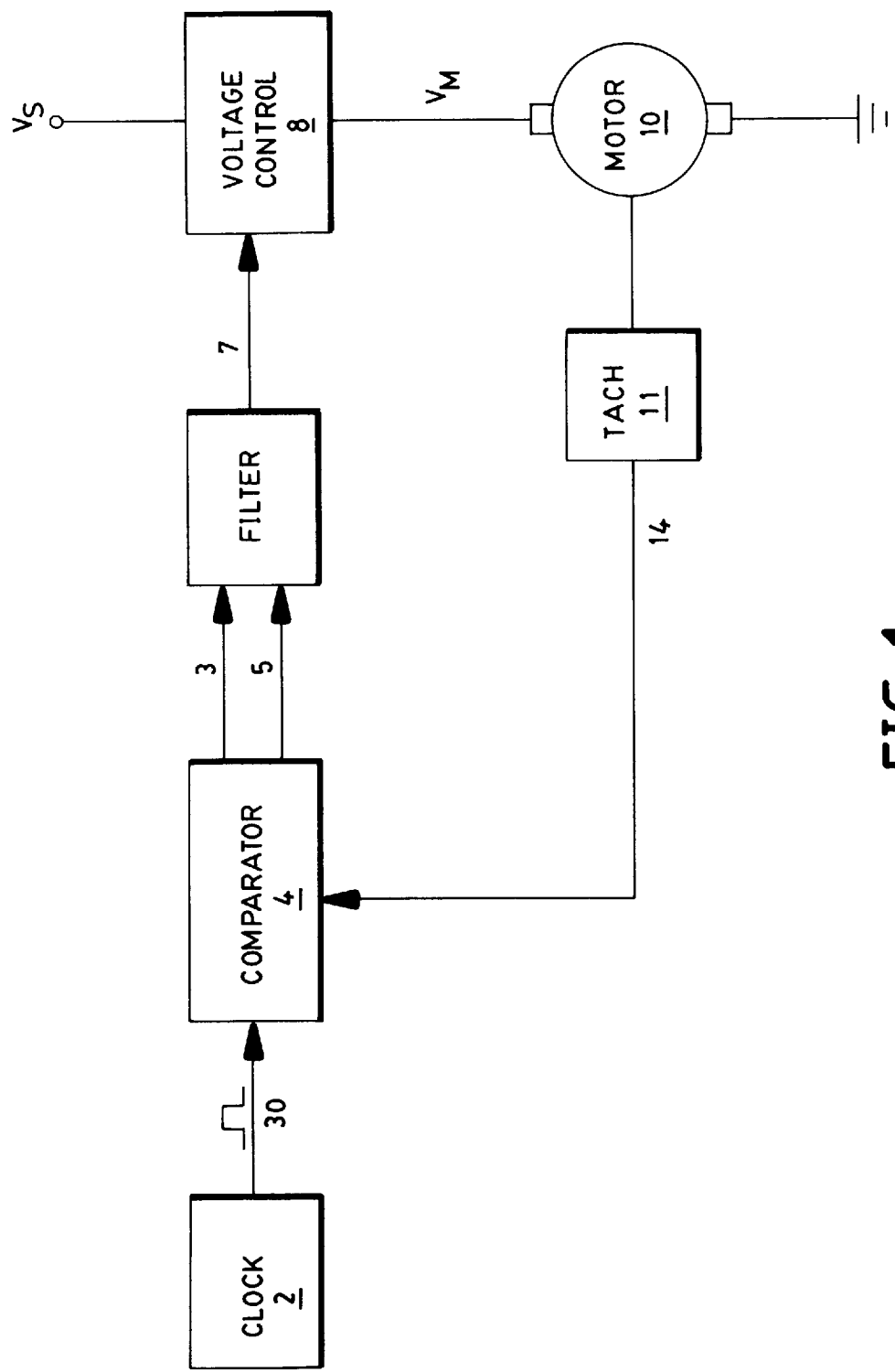
FIG. 1 is a block diagram of a digital motor control system in accordance with the invention.

Referring now to FIG. 1, a motor 10 is shown for use within a printer or any other device which requires motor control. The motor 10 is driven in a rotational motion which is monitored by a speed sensor such as a tachometer 11. The tachometer 11 generates a tachometer pulse upon completion of a predetermined portion of a revolution of the motor 10. A predetermined portion of the revolution can be an entire revolution or any segment thereof as long as the segment has a uniform distribution throughout the entire revolution. In the preferred embodiment, the tachometer 11 generates a tachometer pulse 100–500 times per revolution of the motor 10 depending on motor speed. A stream of tachometer pulses then constitutes a tachometer signal 14 which is fed into a comparator 4.

The comparator 4 compares the tachometer signal 14 to a reference signal 30 generated by a clock 2. The clock 2 is a crystal oscillator which has a substantially fixed frequency. The substantially fixed frequency is chosen to be much higher than the tachometer frequency, often in excess of two hundred times greater, to decrease timing error.

The comparator 4 compares the tachometer signal 14 to the reference signal 30 to determine a time difference from one positive transition to another. The time difference is indicative of the motor 10 rotating too fast or too slow. If a tachometer pulse in the tachometer signal 14 is received before a clock pulse in the reference signal 30 then there is a negative time difference indicating that the motor 10 is rotating faster than the predetermined motor speed and a Go Slower command 3 is issued. Contrarily, if the tachometer pulse in the tachometer signal 14 is received before the clock pulse in the reference signal 30 then there is a positive time phase difference indicating that the motor 10 is rotating slower than the predetermined motor speed and a Go Faster command 5 is issued.

Figure 3:
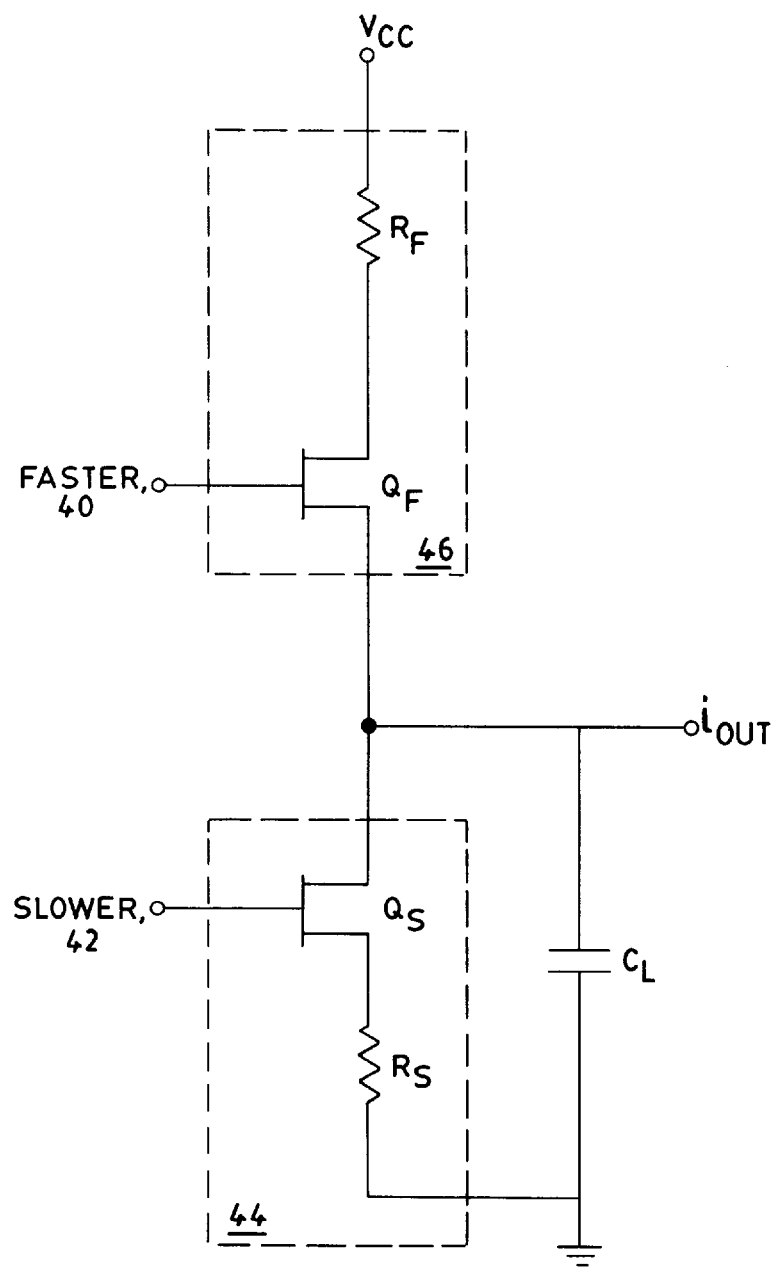
FIG. 3 is an expanded block diagram of a motor control system according to FIG. 1 which shows an alternative embodiment of the motor control system of the invention.

The command output of the comparator is then sent to a filter 6 where it is translated into an adjustment signal 7. In this embodiment, the adjustment signal is a pulse having a high voltage for accelerating the motor 10 and a low voltage for allowing the motor 10 to decelerate. A typical example of an implementation of this filter is shown in FIG. 3.

The adjustment signal 7 is an instruction for the motor to go faster or slower and also indicates how much faster or slower. The adjustment signal 7 is a pulse which has a pulse width, or duration, proportional to an amount of the phase difference and, as previously stated, has a high or low voltage indicating whether the phase difference is positive or negative. The adjustment signal 7 could also take other shapes, a ramp function for example, without detriment to the invention but a pulse has a fast response time and is the preferred shape.

The adjustment signal 7 is fed into a voltage controller 8 which adjusts a supply voltage, $V_S$, to create a motor voltage, $V_M$, to the motor 10. The motor 10 converts the electrical energy of the drive voltage, $V_M$, into mechanical energy manifested as rotational motion of a drive shaft in the motor 10. Rotational speed of the drive shaft in a direct current ("DC") motor is directly related to applied voltage, or motor voltage $V_M$. The relationship varies depending upon the type of DC motor but is clearly exemplified in a common type which has a fixed armature, or electromagnetic loop carrying assembly, which maintains a constant electromagnetic field current. Assuming minimal armature winding inductance, the relationship is as follows:

$$V_M = R_d I_d + k \frac{d\theta}{dt} \quad (1)$$

Rearranging, $$\frac{d\theta}{dt} = (V_M - R_d I_d)/k \quad (2)$$

where
$\frac{d\theta}{dt}$ — Angular velocity, or speed
$I_d$ — Armature Winding Current
$V_M$ — Applied Armature Voltage
$k$ — Motorconstant The second term of equation (1) represents the induced electromotive force, or back emf, which depends on the speed of the rotation of the motor. Solving for the speed of the rotation, it can be seen from (2) that as the armature voltage fluctuates, the speed of rotation, dθ/dt, of the dc motor will also vary proportionally. Consequently, fluctuations in the voltage level would directly affect the speed at which the motor 10 rotates and, in turn, govern the speed at which the print head of a printer moves. Since, as previously stated, the printout of a printer relies on the print head moving at a predetermined constant speed, the speed of the motor 10 must be maintained relatively constant throughout the print.

The voltage controller 8 of FIG. 1 can take any of various forms. One embodiment has the voltage controller 8 as a transistor switch where the adjustment signal 6 is simply a pulse for accelerating motor speed and no pulse for decelerating motor speed. When the pulse is present, the transistor switch allows the supply voltage, $V_S$, to pass to the motor 10, thus accelerating the motor 10. This operates because of the fact that a pulse coming into a base of a bipolar junction transistor provides a base current causing the transistor to become a substantially short circuit between $V_S$ and $V_M$ making the motor 10 increase in speed. If the comparator 4 determines that slower speed is required then no pulse is passed causing the transistor to remain in as a substantially open circuit which would make $V_M$ approximately zero allowing the motor 10 to slowly decrease its speed as a function of mechanical loading.

While this method works, it jumps the drive voltage, $V_M$, with a chopped waveform that varies in duration according to an amount of the aforementioned time difference. Though this method maintains a fairly average error on the movement of the print head, the convergence to the desired speed is relatively soft because both speed up and slow down time intervals are produced whether the motor 10 is too fast or too slow.

Figure 2A:
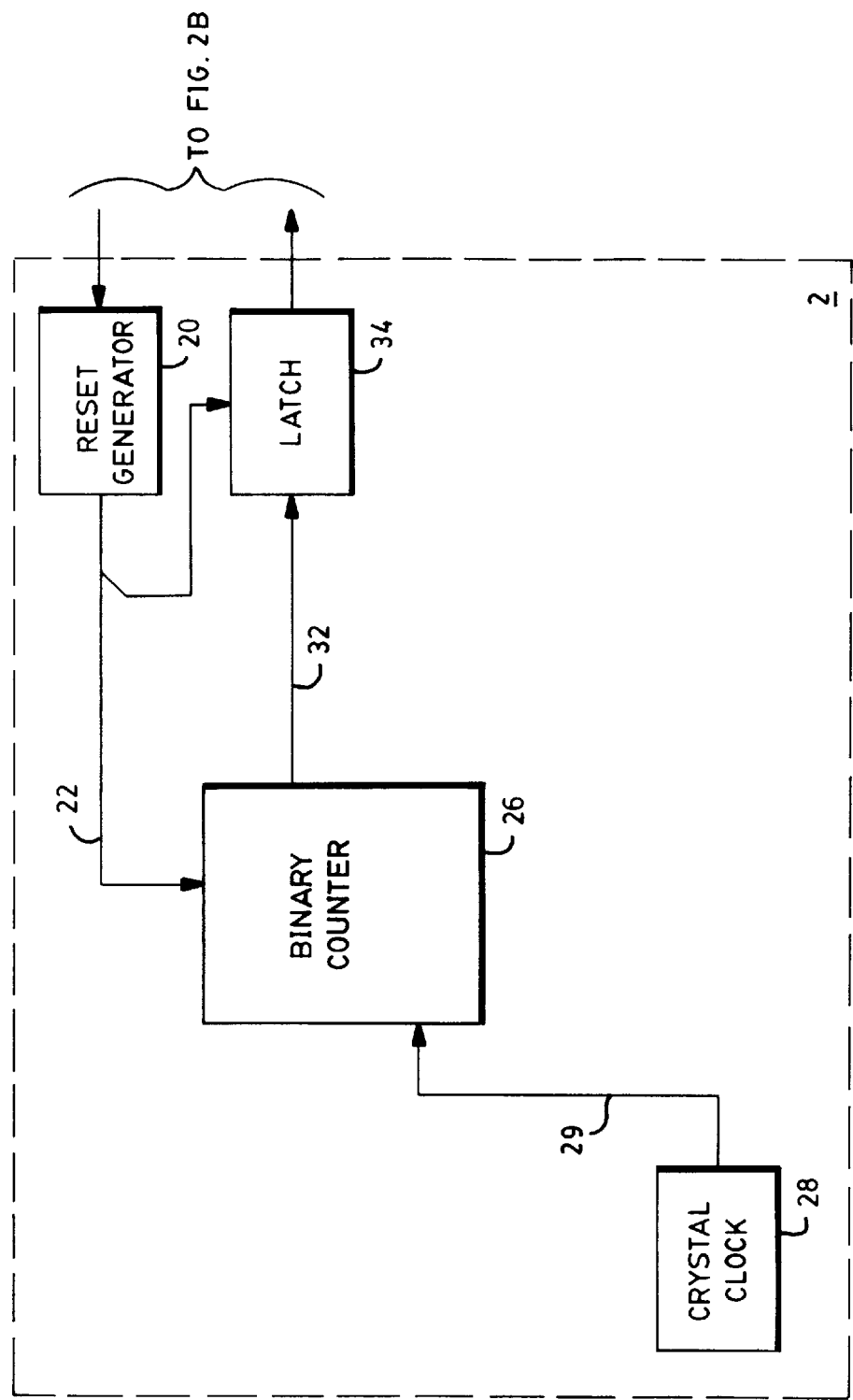
FIGS. 2A and 2B are parts of an expanded block diagram of a motor control system according to FIG. 1 which shows further detail of the motor control system of the invention.
Figure 2B:
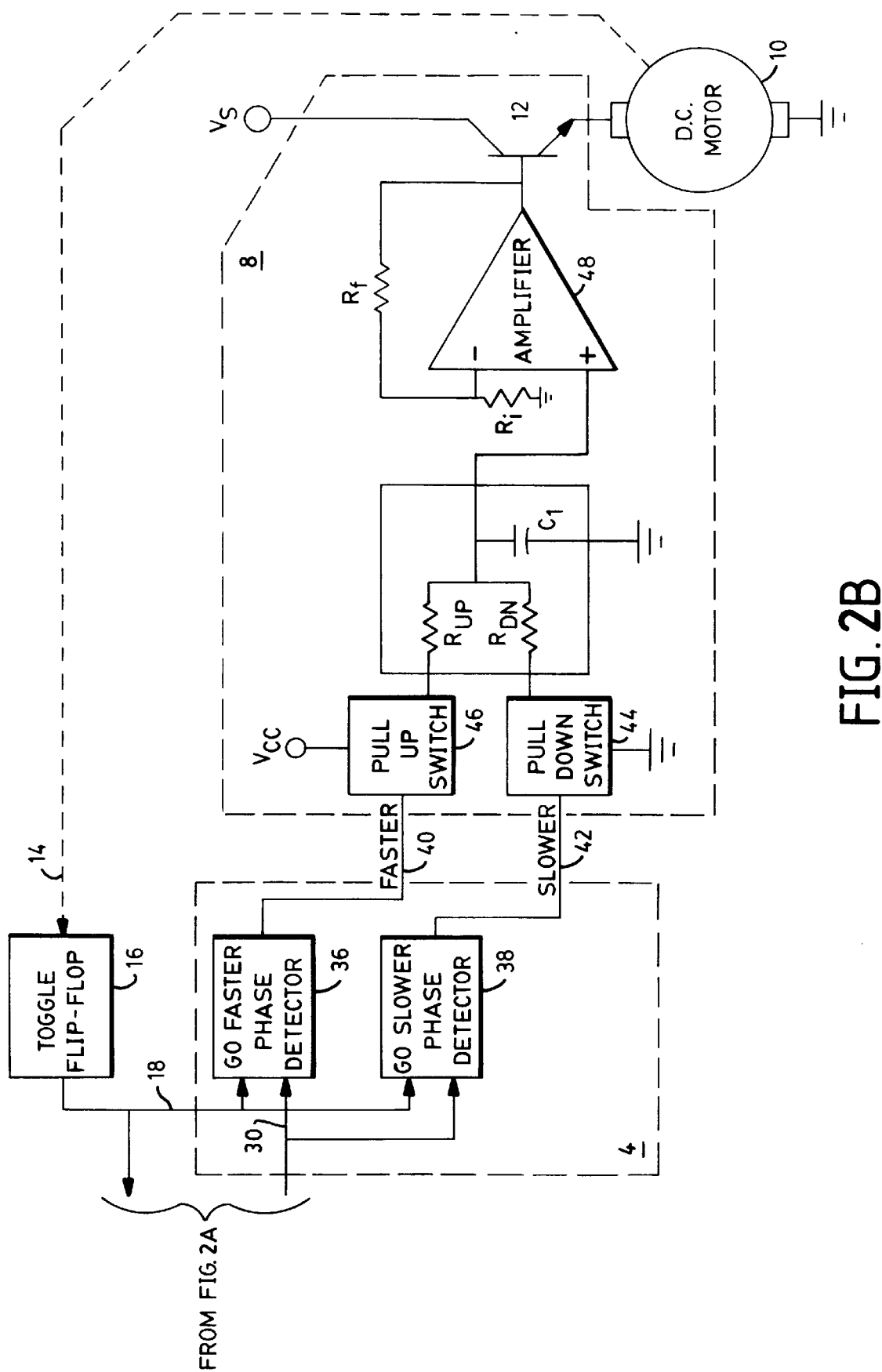
Figure 5A:
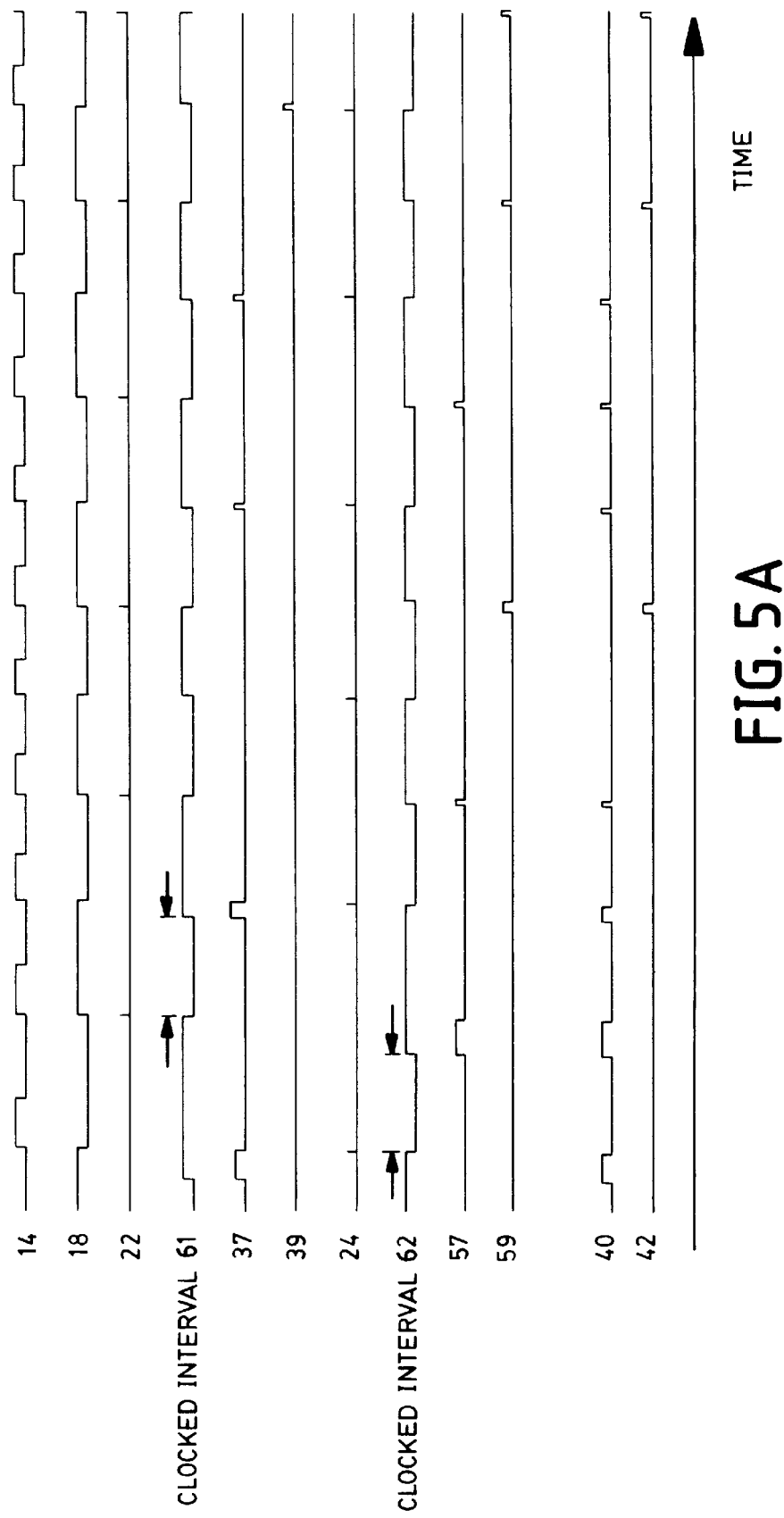
FIG. 5 is a timing diagram of the motor control system illustrated in FIGS. 4A and 4B.
Figure 5B:
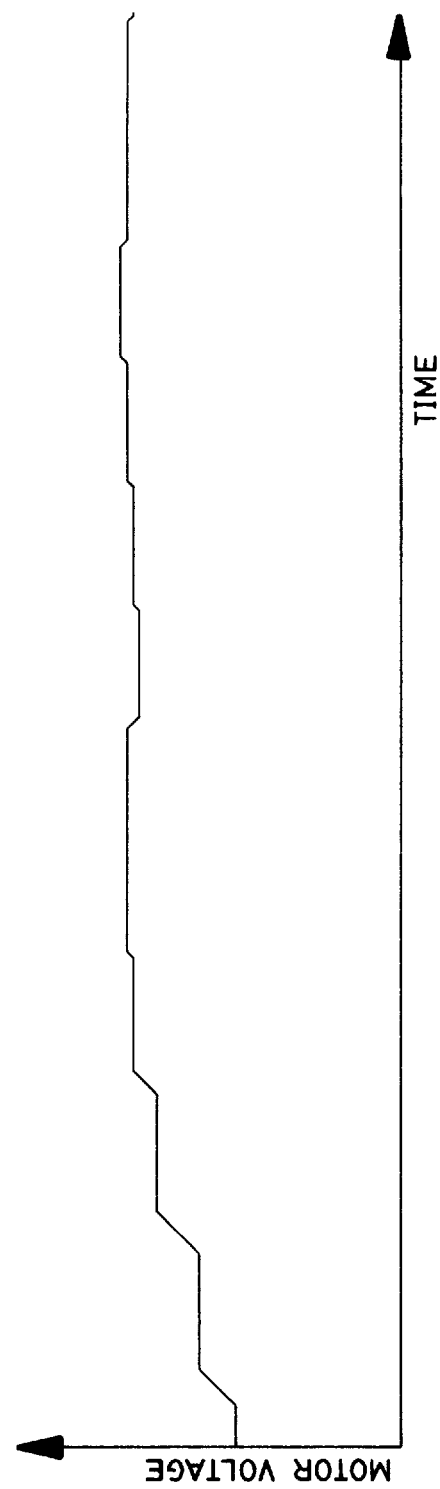

Referring to FIG. 2A and 2B with reference to the timing diagrams of FIG. 5, each of the aforementioned elements are expanded upon and a more useful embodiment of the voltage controller 8 is shown. With respect to the timing diagrams, only the first four time lines reflect single phase operation. In FIG. 2B, the motor 10 transmits through a speed sensor (not shown) a tachometer signal 14. The tachometer signal 14 passes through a toggle flip-flop 16 which shapes the tachometer signal 14 into a square wave having a 50% duty cycle. This also removes any asymmetrical component of the tachometer signal 14.

A flip-flop output signal 18 is then fed into a reset generator 20 which produces a Reset pulse 18 is a. Reset pulse 18 is a pulse that is aligned with positive transitions of tachometer pulse 14.

The reset generator 20 then sends a reset signal 22 to a binary counter 26 and a latch 34 which resets the binary counter 26 to zero and resets the latch 34 to an unlatched position. The binary counter 26 also receives from a crystal clock 28 a clock signal 29 and upon each clock pulse within the clock signal 29, the binary counter 26 counts incrementally.

Once a predetermined count is reached by the binary counter 26, a pulse signal 32 is sent to the latch 34 to. The pulse signal 32 causes the latch 34 set until a subsequent reset signal 22 is received from the reset generator 20. The output from the latch 34 forms a pulse train which is the reference signal 30. This method of generating the reference signal increases precision of the signal by basing the measurement on current measurement without past history. Thus if the number is too slow only faster pulses proportional to the speed error are produced and if the motor 10 is too fast only slower pulses proportional to the speed error are produced.

The clocked output then goes into the comparator 4 which is broken into two separate sections. A "go faster" phase detector 36 compares the reference signal 30 which is a precision fixed-frequency clocked signal to the flip-flop signal 18 which indicates motor speed, thus determining whether the motor 10 is rotating slower than the predetermined speed. Therefore, "go faster" phase detector 36 determines whether the motor 10 must be sped up and, if the motor 10 must be sped up, the "go faster" phase detector 36 issues a faster command 40 to the voltage controller 8.

Likewise, the flip-flop signal 18 is transmitted along with the reference signal 30 to a "go slower" phase detector 38 which determines whether the motor 10 should be slowed down. If that is the case, then a slower command 42 is issued which is sent into the voltage controller 8.

The voltage controller 8 in this embodiment is a filter-amplifier-transistor combination. The filter converts the commands from the comparator 4 into analog voltage levels across a capacitor $C_1$. Capacitor $C_1$ then supplies a voltage input to the amplifier 48 which boosts the voltage and drives the transistor 12 through its base which adjusts the motor voltage $V_M$ to the motor 10.

In practice, if the motor 10 is running slower than the predetermined speed a faster command 40 is issued as previously described. The faster command 40 causes a pull-up switch 46 to create a path between a voltage $V_{CC}$ and the capacitor $C_1$ through a resistor $R_{up}$ thus charging the capacitor at a rate determined by a choice of values for $C_1$ and $R_{up}$.

FIG. 3 illustrates the preferred embodiment of the pull-up switch 46 and the pull-down switch 44. The faster command 40 supplies a control voltage to the gate of a field effect transistor ("FET") $Q_F$. The FET $Q_F$ and resistor $R_F$ form a constant current source charging $C_L$ at a constant rate (dv/dt) during the duration of the faster command establishing a current flow through $R_{up}$.

The increased voltage across capacitor $C_1$, shown in FIG. 2B, increases a voltage to the amplifier 48 proportionally. The amplifier 48 boosts the voltage supplied by capacitor $C_1$ according to a ratio of resistance values of a feedback resistor $R_f$ to an input resistor $R_i + R_f/R_i$.

The output of the amplifier 48 is fed into a series-pass voltage regulator 12 which, in the preferred embodiment, is a transistor biased in an active region. The motor voltage $V_M$ to the dc motor 10 is then increased causing the DC motor 10 to rotate at an increased speed.

If the motor 10 is rotating too fast relative to the predetermined speed, the slower command 42 is issued. The slower command 42 causes a pull-down switch 44 to create a current path between the capacitor $C_1$ and ground through a resistor $R_{ON}$. This drains the capacitor $C_1$ at a rate determined by a choice of values for $C_1$ and $R_{ON}$, decreasing voltage across the capacitor $C_1$ thereby decreasing voltage input to the amplifier 48. The decreased voltage input to the amplifier 48 decreases current to the series-pass voltage regulator 12 thus decreasing the motor voltage $V_M$ and slowing the speed to the DC motor.

Referring again to FIG. 3 showing the preferred embodiment of the pull-down switch 44, the slower command 42 supplies a control voltage to the gate of a FET $Q_s$. FET $Q_s$ and resistor $R_s$ form a constant current sink circuit discharging capacitor $C_1$ at a constant rate (dv/dt) for the duration of the slower command. Current $i_{out}$ is then drawn down through $R_s$ to ground. Thus, the pull-down switch 44 is essentially a current drain.

It should be noted that while neither the faster command 40 nor the slower command 42 are being issued, i.e. between pulses, the capacitor $C_1$ maintains $V_M$ at a substantially constant level, thereby keeping the DC motor 10 operating at a substantially constant speed.

Continuing with FIG. 2A and 2B, when the flip-flop signal 18 indicates that the motor 10 is going too fast, an intervening cycle cannot be measured. This is due to the fact that the flip-flop signal 18 has occurred before the reference signal 30 and, therefore, new time measurements beginning at the start of a flip flop signal 18 cannot be initiated without losing the how much too fast information of the previous interval.

Figure 4A:
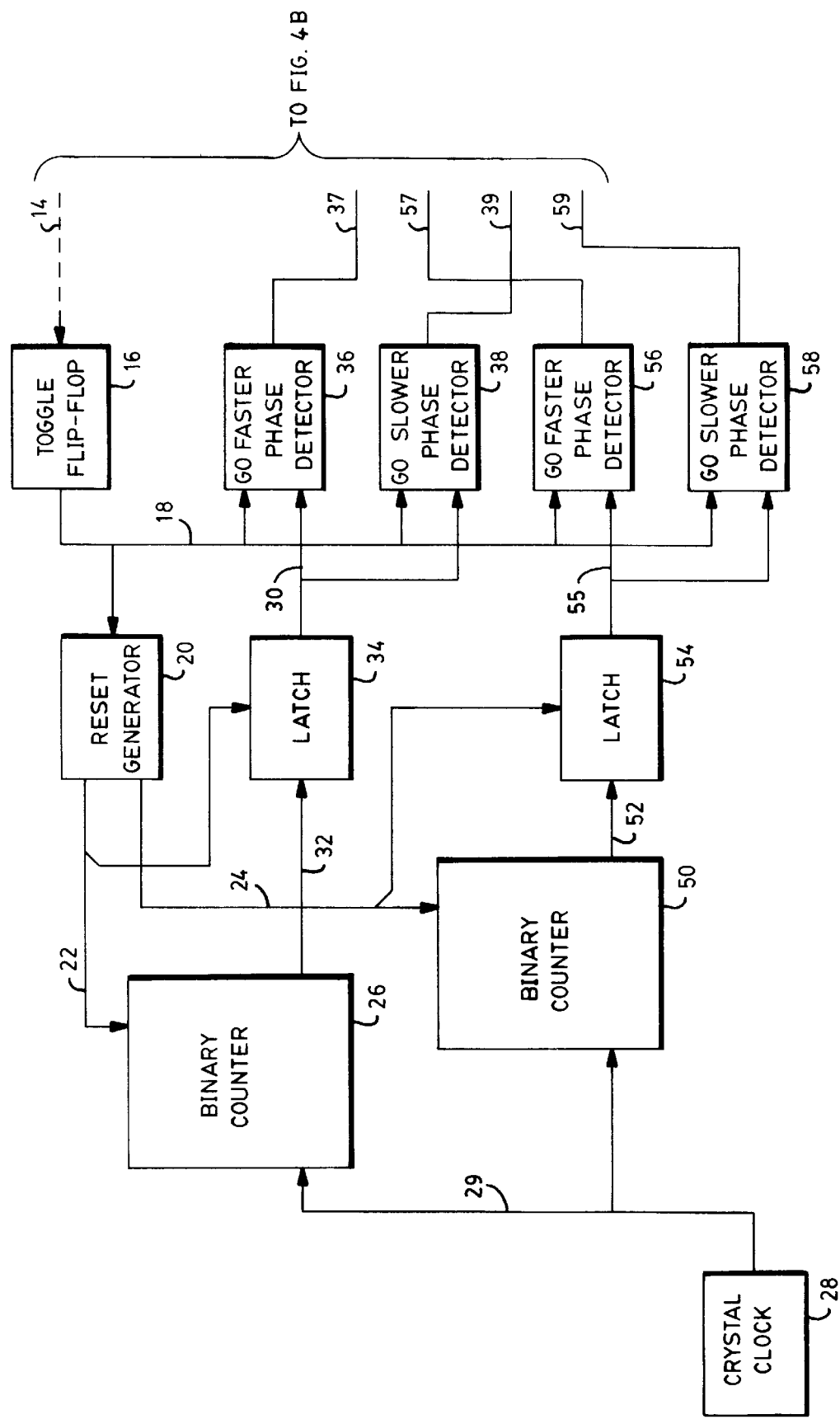
FIGS. 4A and 4B show a block diagram of a motor control system according to the invention which includes dual phase digital control.
Figure 4B:
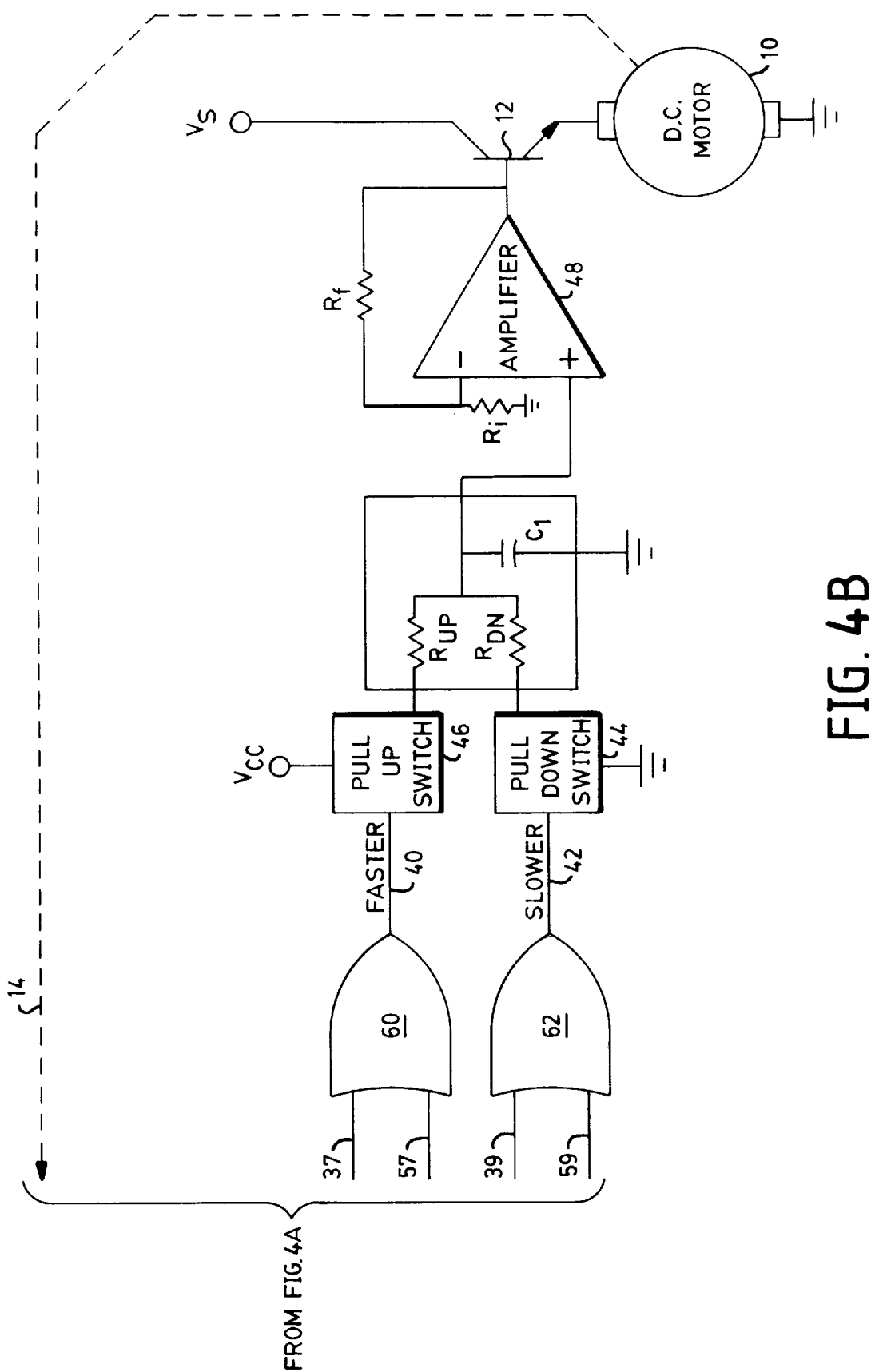

FIG. 4A and 4B along with the timing diagrams of FIG. 5 show an alternative embodiment of the invention which uses two comparators that alternate between clock intervals, thereby measuring motor speed during every possible interval.

In this embodiment, the crystal clock 28 feeds a reference signal 29 into two binary counters 26, 50. The first binary counter 26 feeds the latch 34 as previously described. The second binary counter 50 sends a counter signal 52 to a latch 54 in a similar way as previously described. These binary counters are reset on alternating edges of the flip-flop signals 18 by a reset generator 20. Since the binary counters are reset independently, two separate reset commands are issued, a reset 'A' 22 and a reset 'B' 24. Therefore, each pulse in the tachometer signal 14 starts a new timed interval 61, 63 and alternating intervals start alternating binary counters 26, 50. The output 37 of the "go faster" phase detector 36 is combined using a logical OR function with the output 57 of a "go faster" phase detector 56 by an OR gate 60. The faster command 40 is the output of the OR gate 60 making the faster command 40 issue if either interval is determined to be too slow.

Likewise, an output 39 of the "go slower" phase detector 38 is OR'd with the output 59 of a "go slower" phase detector 58 through an OR gate 62 to create a slower command 42.

Subsequently, the faster command 40 and the slower command 42 are processed as previously described.

As can be seen from the graph of motor voltage versus time, the motor control system system responds quickly and effectively to speed fluctuations in the motor 10.

The aforementioned embodiments of the motor control can be made digitally programmable with the addition of two digital comparators or by replacing the counters with presetable down counters. The digital counters in the first embodiment of the motor controller use MSB (most significant bit) decoding to produce the reference signal 30. The signal being decoded is often communicated from an external source such as a microprocessor which adjusts motor speed to govern an aspect ratio of an amount of zoom, for example. This is the least complicated approach but makes the motor speed choices very limited for a particular crystal frequency, i.e., by factors of two, due to the use of a single bit. Additional decoding bits may be used for finer changes.

Implementing digital comparators into the embodiment of FIG. 2, an output of the binary counter 26 is compared with an external binary input. The external binary input can be supplied by a user or from an internal printer controlled reference. When the count matches the comparator reference, the flip-flop 16 is set as before. The second comparator sets latch 52 in a similar manner.

The second alternative form of the circuit uses two presetable down-counters in place of the simple binary counters. These counters are preset to a user or printer defined count with the reset pulses and the down-counters, in turn, set latches 34 and 54 when they reach zero.

This programmability is a property needed to produce a slow scan control for a zooming printer for example. It also allows printing pixels with variable aspect ratios by allowing changes in a relationship between the a fast and a slow axis, or ordinate and abscissa in a Cartesian coordinate system. A fast scan motor for governing printing along the fast axis is programmed to a proper speed for the particular printer/film requirements; the slow scan motor for governing printing along the slow axis is precisely programmed to any of a variety of different speeds representing pixels of different zooms and aspect ratios. This is further explained in the commonly assigned U.S. Pat. No. 5,526,255 entitled "True Zoom Capability on a Spot Scanning Electronic Printer" incorporated herein by reference.

The D.C. voltage control to the motor 10 can be replaced with other voltage to motor power circuitry. A particularly useful implementation employs a switching regulator to provide motor power. This allows for constant voltage-pulse width modulation control of the motor 10. The advantages are reduced power dissipation of the drive circuit and wider range of speed control than can be achieved with a pure voltage controlled drive. This type of drive can also provide dynamic braking.

Dynamic braking related to the slowdown pulse can be included with the D.C. motor drive circuitry by using a class A amplifier for motor power.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A digital motor control system for controlling the rotational speed of a motor driven by a drive voltage, said digital motor control system comprising:

sensor means coupled to the motor so as to produce a pulse signal comprising a series of pulses occurring at a frequency representative of the rotational speed of the motor;

a flip-flop in electrical communication with said pulse signal, said flip-flop generating a flip-flop output signal comprising a series of pulses, each said flip-flop pulse having a rising edge corresponding to the rising edge of a sensor means pulse, and a falling edge corresponding to the rising edge of the subsequent sensor means pulse;

reset means in electrical communication with said flip-flop output signal pulses, said reset means generating a first set of reset pulses corresponding to the rising edges of said flip-flop pulses and a second set of reset pulses corresponding to the falling edges of said flip-flop pulses;

oscillator means having a substantially fixed frequency;

first binary counter means in electrical communication with said oscillator means and said first set of reset pulses, for generating a first reference signal corresponding to the rising edges of said flip-flop pulses;

second binary counter means in electrical communication with said oscillator means and said second set of reset pulses, for generating a second reference signal corresponding to the falling edges of said flip-flop pulses;

first comparator means in electrical communication with said flip-flop and said first binary counter for comparing said first reference signal with said pulse signal and transmitting a first adjustment pulse corresponding to the rising edges of said flip-flop pulse;

second comparator means in electrical communication with said flip-flop and said second binary counter for comparing said second reference signal with said pulse signal and transmitting a second adjustment pulse corresponding to the falling edges of said flip-flop pulse and switch means in electrical communication with said first and second comparator means for altering the drive voltage to the motor in response to said adjustment pulses to control the speed of the motor.

2. The motor control system according to claim 1 wherein said first and second comparator means transmit a go faster signal or a go slower signal indicative of whether said reference signal is faster or slower, respectively, as compared to said pulse signal.

3. The motor control system according to claim 1 wherein said switch means is an analog switch which varies drive voltage proportional to the duration of said adjustment pulses.

4. The motor control system according to claim 3 wherein said analog switch comprises voltage adjustment means which controls the drive voltage in response to an electrical signal.

5. The motor control system according to claim 4 wherein said voltage adjustment means is a transistor and the electrical signal is a current is a current flowing to a base of the transistor.

6. The motor control system according to claim 5 wherein said voltage adjustment means is a series pass transistor.

7. The motor control system according to claim 4 wherein said analog switch further comprises amplifier means for boosting the electrical signal to drive said voltage adjustment means.

8. The motor control system according to claim 4 wherein said analog switch further comprises energy storage means for storing energy sufficient to provide the electrical signal to maintain the speed of the motor in the absence of said adjustment pulses.

9. The motor control system according to claim 8 wherein said energy storage means is a capacitor.

10. The motor control system according to claim 1 wherein said switch means is a digital switch which is normally closed and opens in response to said adjustment pulses for a duration substantially equal to the duration of said adjustment pulses.

11. The motor control system according to claim 10 wherein said digital switch is a transistor alternating between a cutoff mode for discontinuing the drive voltage to the motor thus slowing the motor, and a saturation mode for passing the drive voltage to the motor thus accelerating the speed of the motor.

12. The motor control system according to claim 1 further comprising filter means in electrical communication with said first comparator means for converting said first adjustment pulse from said first comparator means into analog voltage levels proportional to the magnitude of the difference between said pulse signal and said reference signal, and said switch means is an analog switch which varies drive voltage in response to said analog voltage levels.

13. The motor control system according to claim 1 wherein said first comparator means is a digital comparator which adjusts the speed of the motor in response to a predetermined value.

* * * * *